July 8, 1969

H. C. POLLITZ ET AL 3,453,939

BITUMINOUS PAVER

Filed June 21, 1966

INVENTORS
HAROLD C. POLLITZ
VERNON L. SCHRIMPER
LOUIS F. FAIRCHILD

BY

ATTORNEY

INVENTORS
HAROLD C. POLLITZ
VERNON L. SCHRIMPER
LOUIS F. FAIRCHILD
BY
ATTORNEY

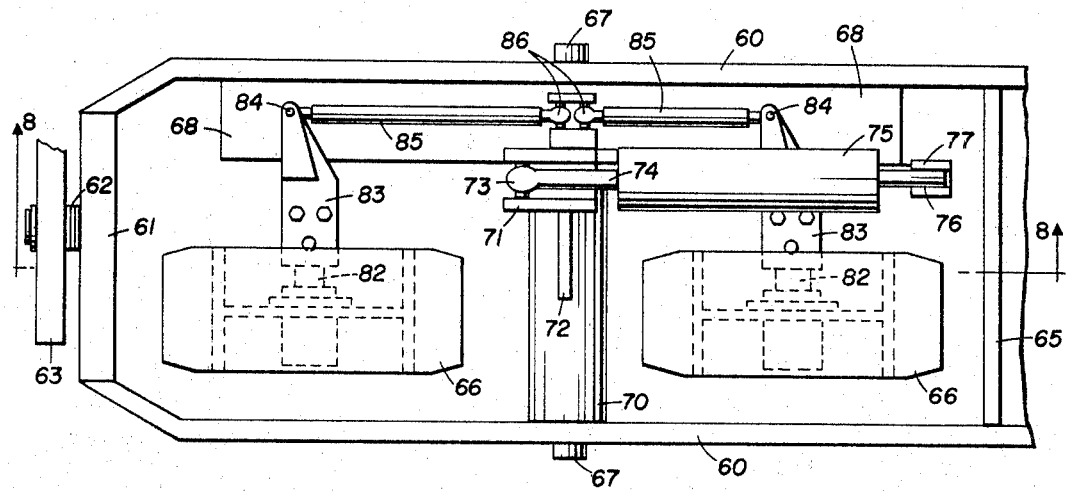
FIG 7
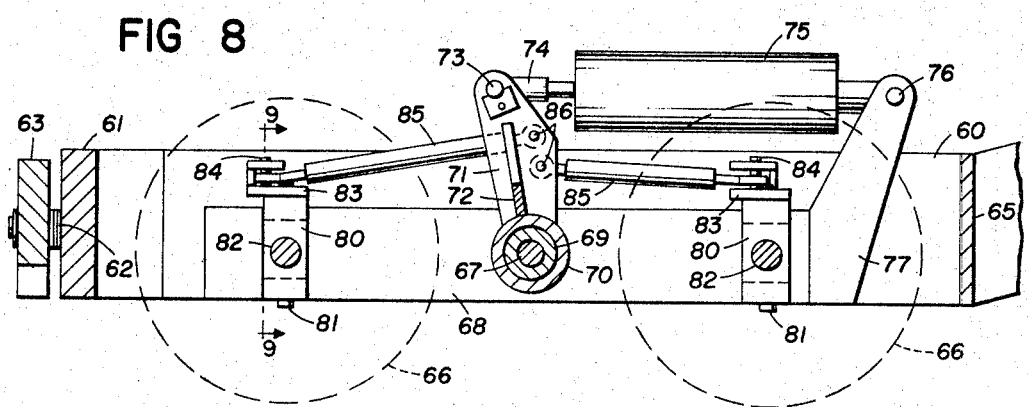
FIG 8
FIG 9
INVENTORS
HAROLD C. POLLITZ
VERNON L. SCHRIMPER
LOUIS F. FAIRCHILD
BY
ATTORNEY

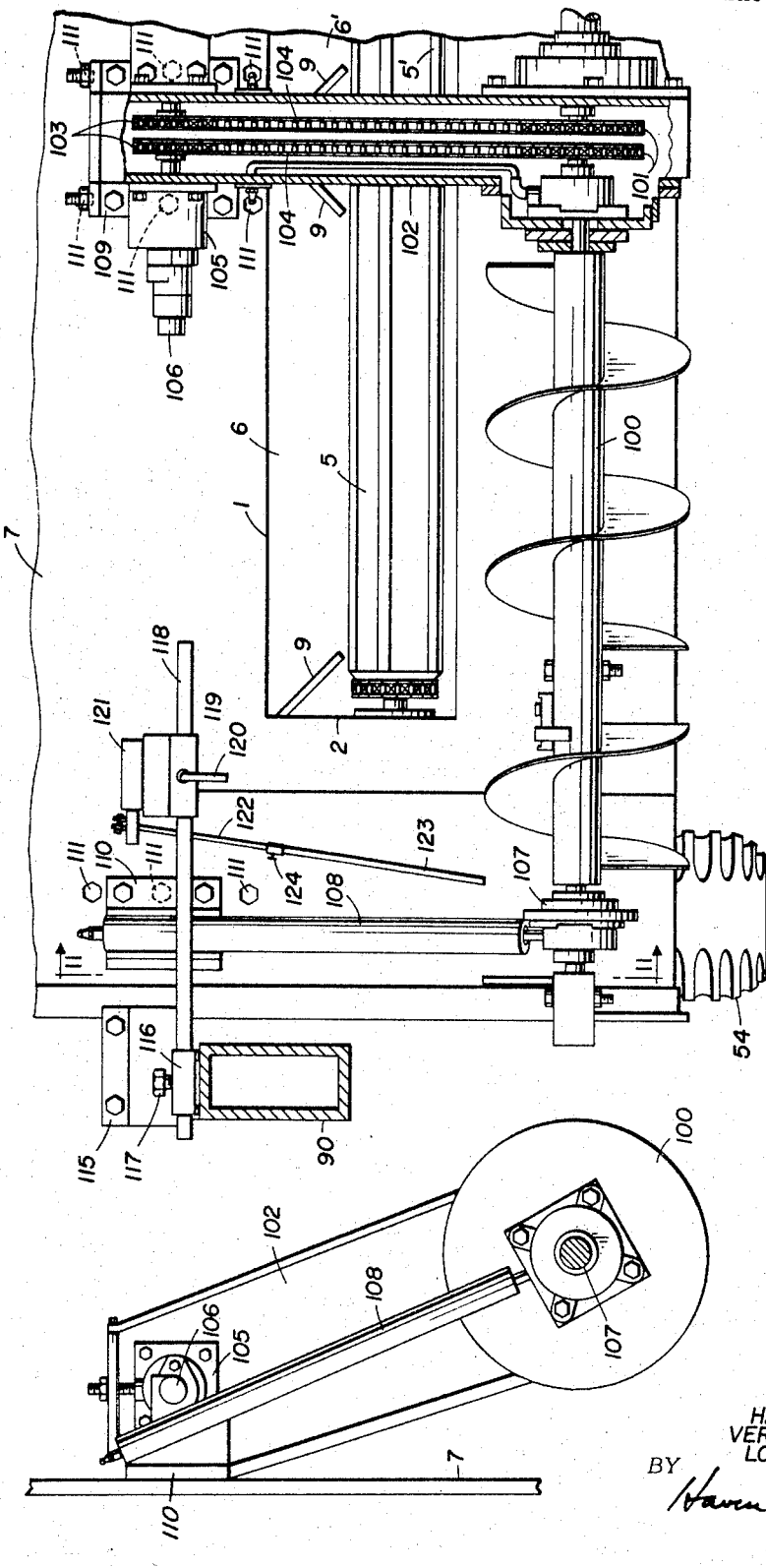

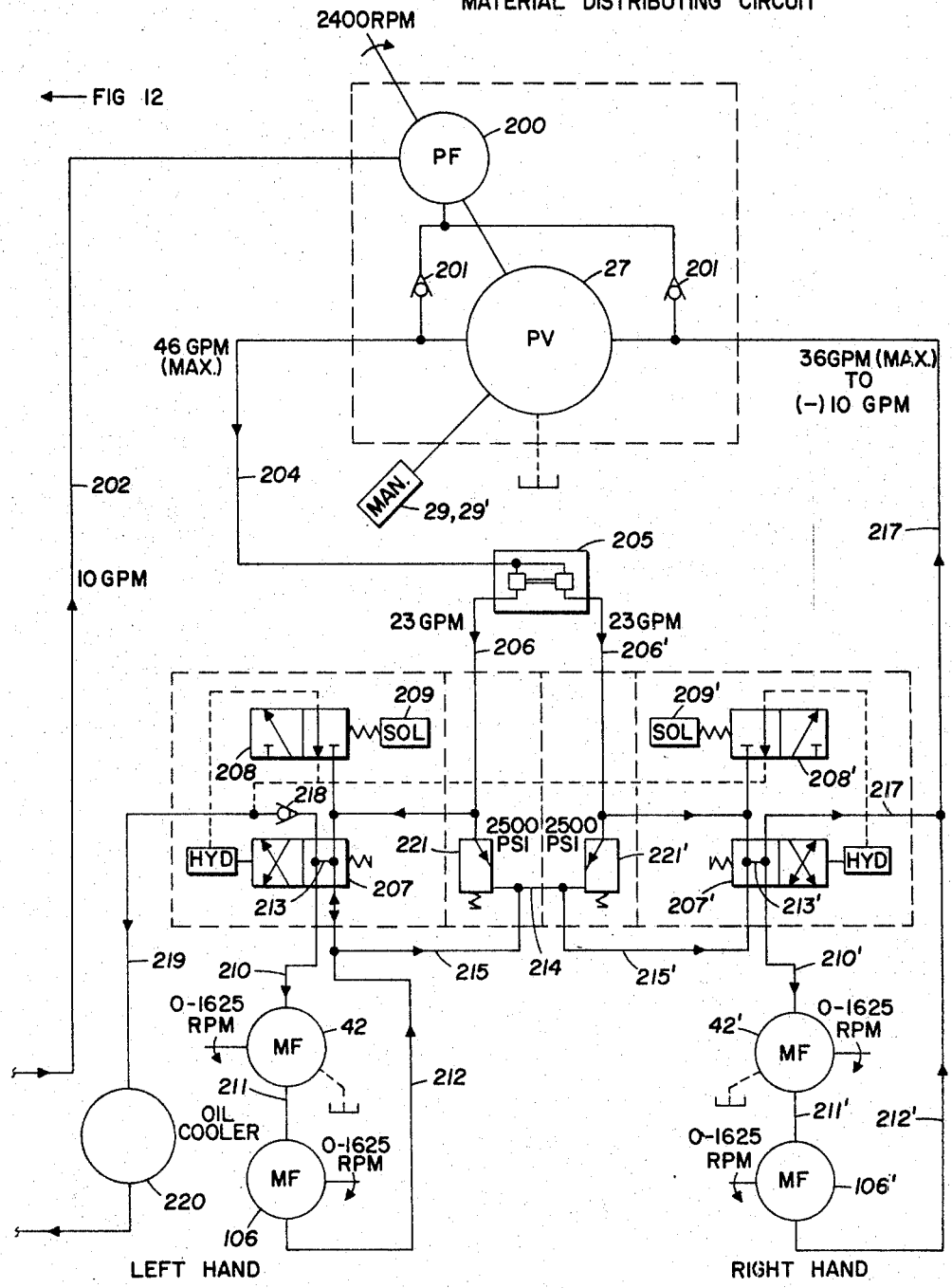
FIG 14
INVENTORS
HAROLD C. POLLITZ
VERNON L. SCHRIMPER
LOUIS F. FAIRCHILD
BY 
ATTORNEY

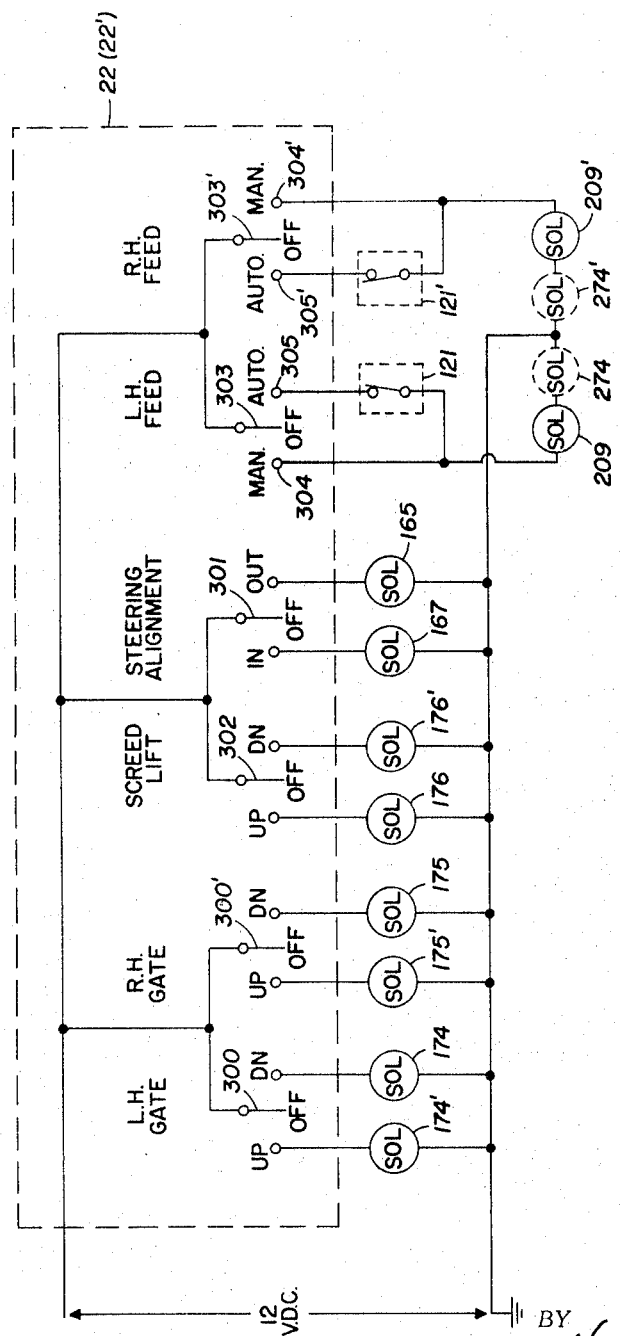

United States Patent Office 3,453,939
Patented July 8, 1969

3,453,939
BITUMINOUS PAVER
Harold C. Pollitz, Vernon L. Schrimper, and Louis F. Fairchild, Cedar Rapids, Iowa, assignors to Iowa Manufacturing Company of Cedar Rapids, Iowa, Cedar Rapids, Iowa, a corporation of Iowa
Filed June 21, 1966, Ser. No. 559,220
Int. Cl. E01c *19/48, 19/08*
U.S. Cl. 94—46                            27 Claims

ABSTRACT OF THE DISCLOSURE

A bituminous paving machine employing a tractor unit, a floating screed and material conveyors and distributing screws in which, in order to increase its flexibility and adaptability to varying paving conditions, the speeds of the drives for traction and for the conveyors and distributing screws can be infinitely varied relative to and independently of each other during an actual paving run. In the three preferred embodiments of the invention described, hydraulic means are employed for all the paver drive systems, as well as for steering, inasmuch as the particular paver disclosed is rubber tired and employs dirigible wheels. The basic aspects of the invention, however, are equally applicable to pavers of the type concerned having endless tracks. In all the foregoing embodiments a single lever controls the forward and reverse speeds of the tractor over an infinite number of steps while, independently thereof, another lever governs the speed of the material conveyors and distributing screws also over an infinite number of steps. Both levers are readily accessible to the paver operator during paving operation. In the other two embodiments of the invention the speeds of various combinations of the material conveyors and the distributing screws relative to each other can also be varied over an infinite number of steps.

BACKGROUND OF THE INVENTION

A basic aim in the design of any bituminous paver, no matter what the particular type may be, is the maintenance of continuous, uninterrupted operation throughout a paving run. If all drives for traction and material distribution can be kept functioning evenly and continuously, uniform flow of material, even and efficient power consumption and uniform compaction are possible, whence results a bituminous mat of uniform density and excellent finish. Unfortunately, the foregoing objects are rarely or only imperfectly achieved by bituminous pavers of the kinds currently in use. Typically, present day pavers employ mechanical drive trains that include electric, hydraulic or air clutches, chains, V-belts, shafts and universal joints together with shiftable gear boxes. These result in the speeds of operation of the tractor and the material distributing components all having a fixed ratio with respect to each other, which ratio cannot be changed, except to the limited extent provided by the paver's gearbox or gearboxes, during actual paving, that is to say, "on the run." Accordingly, as various paving conditions are encountered, operation of one or more of the foregoing components must be interrupted from time to time in order to try to accommodate the paver's performance to particular paving conditions.

Owing to the nature of conventional drives for traction and material distribution, any interruption in the operation of one requires the drive therefor to be totally disconnected; in other words, each such drive is either wholly on or wholly off. For instance, the speed of the paver cannot be varied, except in fixed steps by shifting gears, relative to the speed of the material distributing components. Likewise, the individual speeds of the latter cannot be varied relative to each other or, except in fixed steps, to the speed of the tractor. Thus, when conditions encountered during a paving run require continuously varying amounts of material to be supplied to the roadway, neither the speed of the tractor nor that of the material distributing components can be likewise continuously altered to accommodate the varying demands; as noted, each is either wholly on or off. Under these circumstances, all-on, all-off operation of each of the various components necessarily tends towards unwanted variations in mat densities and finish and additionally in uneven and inefficient power consumption.

It is the chief object of the present invention, therefore, to devise a bituminous paver wherein different paving requirements encountered during a paving run may in turn be easily accommodated by the paver as the machine proceeds. Basically, the foregoing object is achieved by a paver in which the speeds of the tractor and of the material distributing system can be continually varied relative to and independently of each other easily and quickly while the paver is in actual operation. In the present instance, hydraulic means for both drive systems of the paver, that for traction as well as that for material distribution, are preferably employed, and are arranged and controlled so that the speeds of their driven components may be infinitely varied as conditions demand. As noted hereinafter, means other than hydraulic may be used, inasmuch as the present invention broadly encompasses continuous and infinite adjustability of the speeds of the paver's tractor and material distributing system relative to and independently of each other while on the run, as well as particular means for accomplishing this purpose.

SUMMARY OF THE INVENTION

The particular paver to be described is of the wheeled rather than of the crawler type. However, the invention, with relatively minor changes in components and hydraulic circuitry, is equally applicable to those pavers employing crawlers or tracks. Indeed, such changes as would be necessary in the case of a machine equipped with crawlers are confined entirely to the traction drive, the material distributing systems being the same in either case. In addition, the particular paver herein described is of the well-known "floating screed" type employing a forward tractor unit and a trailing screed assembly, the latter drawn by a pair of trailing screed arms pivoted at their forward ends to the sides of the tractor. The tractor in turn includes a large, forwardly mounted hopper in which the mixed bituminous materials are received and stored momentarily until required. From the hopper a material distributing system transports the material rearwardly, discharges it on the roadway at the rear of the tractor and spreads it laterally outwardly along the front of the advancing screed assembly. The particular material distributing system comprises a pair of adjacent slat conveyors and a pair of laterally extending distributing screws symmetrically disposed to the left and right of the longitudinal center line of the paver. A right and left hand material distributing system is employed in order to provide material independently to either the right hand or left hand portion of the screed assembly. Since mat width is not always balanced symmetrically about the longitudinal center line of the paver, the drives to the left hand and right hand material distributing components are accordingly independent of each other.

The tractor unit itself is of the three-point suspension type. Two of these points are provided by a pair of large, pneumatic tired wheels pivoted on stub axles at the rear corners of the tractor. The after ends of two pairs of side members are also pivoted to the foregoing axles and extend forwardly along the sides of the tractor, being pivotally connected in turn to the ends of a transverse "oscillating beam" at the forward end of the tractor. The mid-point of the forward end of the tractor is pivoted to the mid-point of the oscillating beam, which pivot together with those of the rear ends of the side members forms the three suspension points of the tractor. Consequently, the tractor frame is entirely relieved of tortional stresses to which the frame of a tractor employing four or more points of suspension is inherently subjected. A pair of short rocking beams are pivoted to the forward ends of the side members, the beams extending fore and aft of their pivots, and to the ends of each beam in turn is journaled a pair of dirigible wheels in tandem having high load capacity rubber tires. Each pair of forward dirigible wheels is connected together by a novel linkage, permitting individually correct turning circles for the two wheels. Each pair of wheels is steered by one of a pair of hydraulic rams, the two rams being suitably connected hydraulically and controlled by either of a pair of rotary steering valves, one at each control station on the paver, and operated by a conventional steering wheel. Since fluids inherently expand and contract owing to temperature changes, a valving arrangement is provided in order to compensate for the resulting fluid volume changes and maintain correct wheel alignment. Hydraulic fluid for the two rams is supplied by a single, fixed flow hydraulic pump driven off the timing gear end of the engine. In effect, a complete system of power steering is provided with but a single control by which to vary direction of the tractor. Further details of the steering arrangement and its hydraulic circuitry will be found in the more detailed description hereinafter.

The tractor is also driven by hydraulic means so that, as is preferable, tractor speed may be easily and infinitely adjusted. This is accomplished by a reversible flow, variable displacement hydraulic pump driven off the flywheel of the engine and transmitting its fluid in a closed circuit to a fixed displacement type of hydraulic motor. The latter in turn is coupled to a gear box whose output is delivered to a suitable differential unit. A pair of transverse drive shafts, extending outwardly from the differential unit, drive each of the rear traction wheels by means of chain and sprocket arrangements. Duplicate manual controls available to the operator at either side of the paver vary the displacement and direction of fluid flow of the hydraulic pump and thus provide for infinite variation in paving speed, independently of the gear box, during an actual paving run. In the case of a crawler type tractor, employing skid steering, a different hydraulic system would of course be employed both for steering and for drive. In that case, a constant displacement hydraulic pump might, for instance, be used to drive a pair of independent variable speed hydraulic motors, one driving each crawler and both capable of conjoint or independent operation relative to each other. There, too, infinite variations in paving speed would be available during a paving run independently of the gear box. In neither the wheeled nor crawler version is any form of clutch needed or used in the drive train.

The material distributing system, comprising right and left hand slat conveyors and corresponding right and left hand distributing screws, is likewise driven by hydraulic means so that, as is preferable, its speed may be also infinitely varied with respect to the speed of the tractor. The drive for the material distributing components includes a second variable displacement hydraulic pump, also driven from the fly wheel of the engine, and provided with a manual control mounted adjacent that for the traction drive at each control station on the paver. Each slat conveyor and distributing screw is provided with its own individual hydraulic motor and driven through a suitable drive chain and sprockets. No clutch is needed or used. Three alternate control arrangements for the material distributing system are provided. The most basic and simplest of these arrangements is also the least flexible but is adequate under most circumstances. The output of the variable displacement pump is fed to a fixed flow proportionator which divides the fluid flow equally between a pair of main control valves, each such valve being controlled by a solenoid operated hydraulic servo valve. One of the two main control valves supplies the two motors of the conveyor and distributing screw on one side of the paver and the other such valve the two motors of the conveyor and distributing screw on the other side of the paver, the two motors on each side being connected in series with each other. Thus, the speeds of the two conveyors and distributing screws on both sides of the paver can be infinitely and concurrently adjusted relative to the speed of the paver itself by means of the variable displacement pump. Each slat conveyor, as is conventional practice, is also equipped with an adjustable metering gate at the rear of the hopper, which is also hydraulically operated so that it may be adjusted by the operator from either control station. Finally, the solenoid of each servo valve is wired in series with an automatic feed control switch for one side of the paver and its manually operated override switch of the nature and for the purposes described in U.S. Patent Re. 25,275 to Pollitz.

The first alternate arrangement of the material distributing control system provides greater flexibility but is necessarily somewhat more complicated. In this case, the output of the variable displacement pump is led through a pair of series related main control valves operated by solenoid activated hydraulic servo valves. The output of each main control valve is led to a manually adjustable flow proportioner having two outlets, one each for the two motors of the slat conveyor and distributing screw on one side of the paver. The output of the other main control valve is led through a second manually adjustable flow proportioner whose two outlets feed the two motors for the slat conveyor and distributing screw on the other side of the paver. The control for each such flow proportioner is mounted on the rear of the tractor for access by the screedman. Thus, not only can the speeds of all four motors be concurrently increased or decreased by means of the variable displacement pump relative to the speed of the paver, but the speed of the slat conveyor on one side can also be varied inversely to that of its distributing screw, which is helpful under more extreme paving conditions. As before, the solenoids of the servo valves are wired in series with the automatic feed control switches.

In the second alternate control arrangement, providing the greatest flexibility but being also the most elaborate, the output of the variable displacement pump passes the fluid first through a manually adjustable flow proportioner and thence in parallel through two pairs of main hydraulic control valves, the control valves of each pair being in series with each other. As before, each main control valve is activated by a solenoid operated hydraulic servo valve. One of the pairs of main control valves governs the flow of fluid to the two hydraulic motors for the slat conveyors, the other pair of main control valves governing the flow of fluid to the two hydraulic motors for the distributing screws. Bypassing each main control valve is a manually adjustable bleeder valve, all of the latter and the manually adjustable flow proportioner being mounted on the rear of the tractor for ready access by the screedman. Likewise, the solenoids of the servo valves are wired in series with the automatic feed control switches, each switch controlling the two servo valves for the conveyor and the distributing screw on its side of the paver. Accordingly, when all four main control valves are open, manual control of the displacement of the pump will permit the speeds of both pairs of slat conveyors and distributing screws to be concurrently increased or decreased over an infinite number of steps. In addition, manual control of the flow proportioner will permit infinite, concurrent adjustment of the speeds of both slat conveyors relative to the speeds of both distributing screws. Finally, the speed of one slat conveyor or distributing screw relative to that of the other conveyor or distributing screw, as the case may be, can be infinitely altered independently of each other by adjustment of the bleeder valves associated therewith. Thus, the most extreme paving conditions can be readily accommodated.

In any case, no matter which control system is employed, the speed of the material distributing system as a whole may be infinitely adjusted relative to that of the paver. This is in great contrast to present pavers in which the relative speeds of the paver, the slat conveyors and the distributing screws can only be adjusted by altering the various drive sprockets, a laborious and time consuming task for which the paver must be entirely shut down, or by employing additional shiftable gear boxes. Another great advantage provided by all three control arrangements is that, since individual hydraulic motors are employed, there is no need for any mechanical drive connection to the tractor itself. Thus, the entire distributing screw assembly may be arranged so that it can be adjusted vertically or horizontally fore and aft between the tractor and the screed mold board in order to achieve the most suitable position for a given paving condition. Vertical adjustment of the distributing screws is very helpful in accommodating different mat thicknesses or when certain critical mixes are employed. For instance, a lower than normal setting may be used for thin mats and a higher than normal one for thick mats. Movement of the distributing screws horizontally fore and aft is often helpful when harsh mix characteristics are encountered. All of these circumstances are hard to handle in conventional paving machines wherein the location of the distributing screws is necessarily fixed owing to the mechanical nature of their drive from the tractor.

A number of additional advantages also accrue from the two alternate arrangements for control of the material distributing system. In conventional pavers and in that employing the basic control arrangement for material distribution, when the amount of material reaching the outer end of the distributing screws has to be increased, under certain adverse conditions, the metering gate for the conveyor associated with that screw must be closed down in order to limit the amount of material carried back thereby and give the distributing screw time to carry more material to its outer end; however, part of the efficiency of the slat conveyor is thereby sacrificed because it is then operating below its design capacity. Furthermore, other adverse paving conditions result in intermittent operation of both the slat conveyor and distributing screw of each pair owing to the action of the automatic or manual feed control switches. Either of the latter two control arrangements for the material distributing system, on the other hand, permitting the speed of each slat conveyor and its distributing screw to be all easily adjusted relative to each other during a paving run, not only reduces the operation of the automatic feed control switches but permits the metering gates to be wholly eliminated since their functions are now performed by control of the speeds of the slat conveyors themselves relative to those of the distributing screws.

A final feature of the present paver, also adding to its flexibility and accuracy, regardless of which of the three control systems is employed, is the placement of the automatic feed control switches on the screed arms or at least at locations wherein the switch control arms may ride up and down with the screed. In the past and as shown in the aforesaid patent, these switches have been customarily placed at the rear of the tractor unit itself. However, the rear of the tractor is subject to vertical movements which are not and should not be transmitted to the screed assembly. When the switches are located upon the tractor, they may interrupt operation of the slat conveyors and distributing screws, for instance, should the rear of the tractor encounter a depression, at the very time when extra material is needed before the screed in order to fill the depression. When, on the other hand, the automatic feed control switches are located upon the screed assembly proper, in effect with reference to the bottom of the screed plate rather than with reference to the rear end of the tractor, more accurate control of the material fed to the screed is achieved. This is especially important when an automatic screed control system is also incorporated in the paver, such as described in U.S. Patent 3,111,070 to Pollitz.

In sum, the paver of the present invention in its basic preferred form provides the operator with individual controls of the speed of the paver and that of the entire material distributing system over an infinite number of steps relative to each other as conditions may demand during a paving run. The two alternate control arrangements additionally provide individual control of the speeds of the slat conveyors and distributing screws relative to each other, which is useful under more extreme paving conditions. These and other features, objects and advantages of the present invention will appear even more clearly from the following detailed description of the three embodiments thereof, being the best modes contemplated for carrying out the invention.

BRIEF DESCRIPTION OF THE DRAWINGS

FIGURE 7 is a partial plan view taken along the line 7—7 of FIGURE 1 illustrating the steering components;

FIGURE 8 is a vertical sectional view taken along the line 8—8 of FIGURE 7;

FIGURE 9 is a vertical sectional view taken along the line 9—9 of FIGURE 8;

FIGURE 10 is a partial vertical view taken along the line 10—10 of FIGURE 1 illustrating the left hand material distributing components;

FIGURE 11 is a vertical sectional view taken along the line 11—11 of FIGURE 10;

FIGURES 12, 13, and 14 are a composite schematic illustration of the hydraulic circuitry of the paver of FIGURE 1;

FIGURE 15 is a schematic illustration of a portion of the electrical circuit of the paver of FIGURE 1.

DESCRIPTION OF THE PREFERRED EMBODIMENTS

Figure 1:
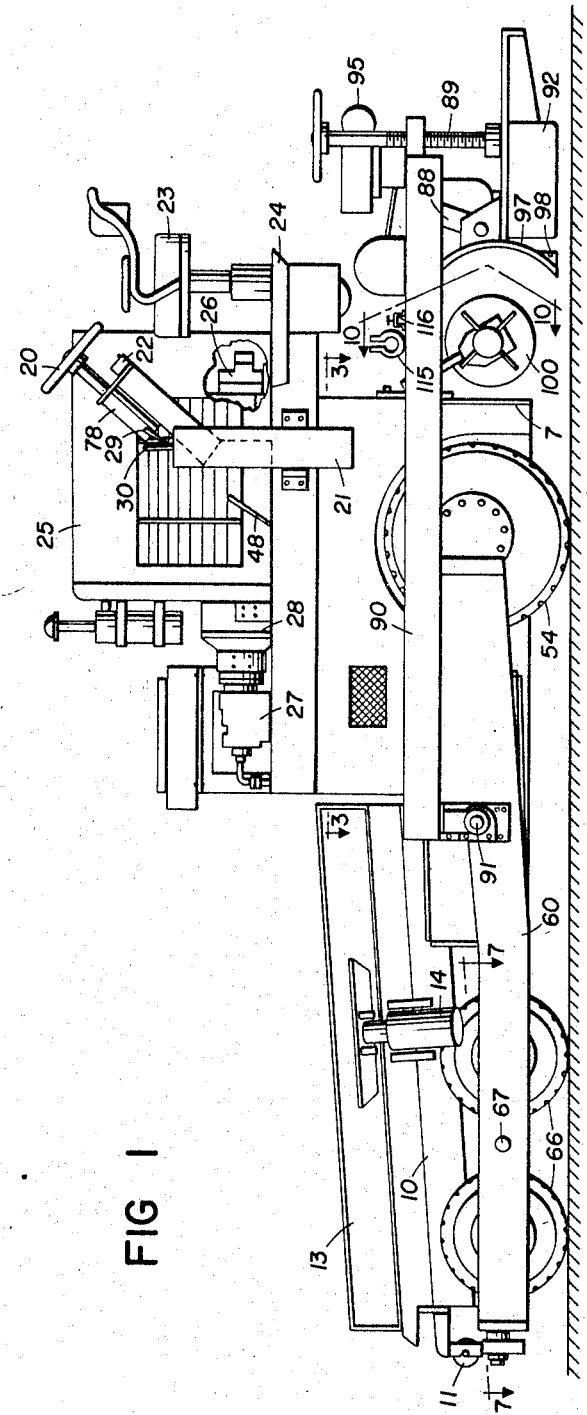
FIGURE 1 is a side elevation of a paver according to the present invention, the cutoff plates being omitted for clarity and certain portions being broken away.
Figure 2:
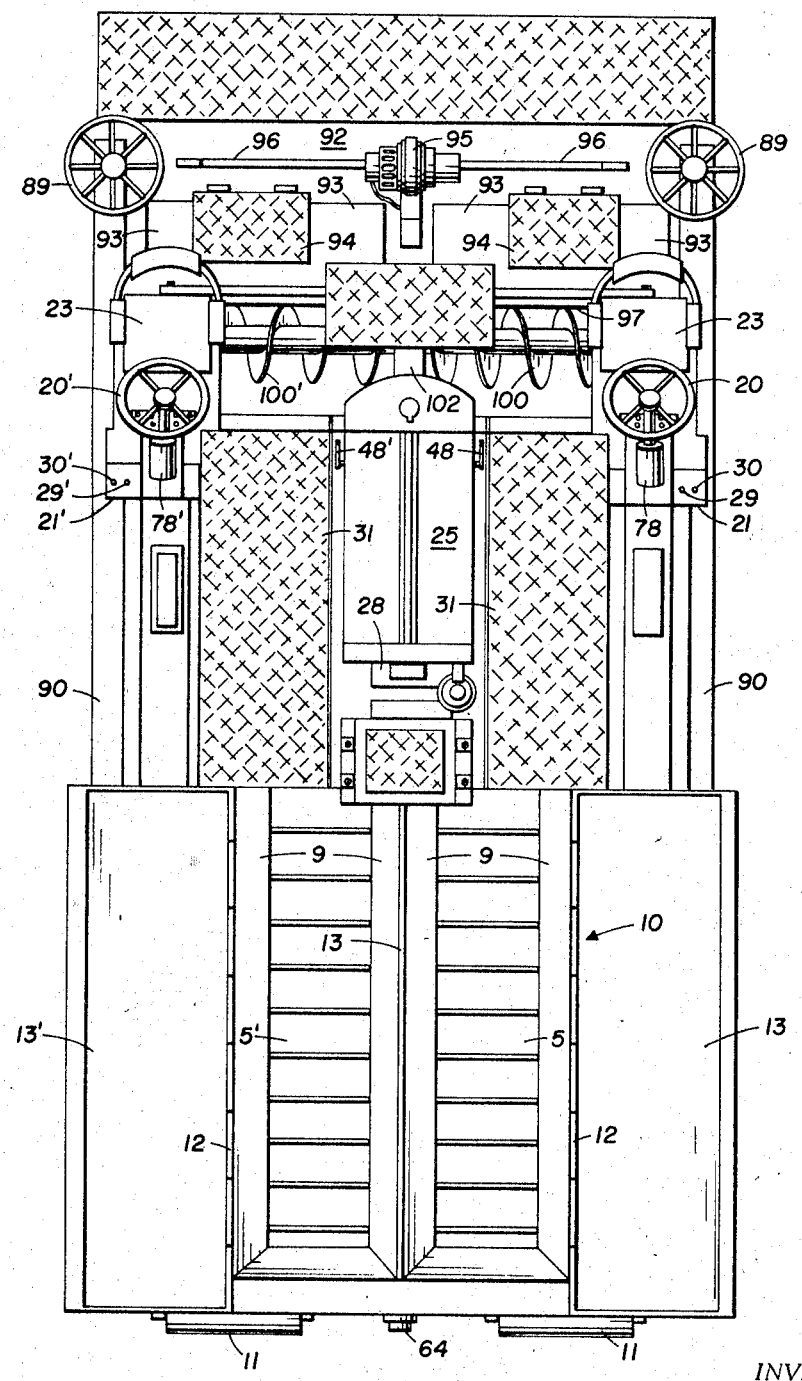
FIGURE 2 is a top plan view of the paver of FIGURE 1.
Figure 3:
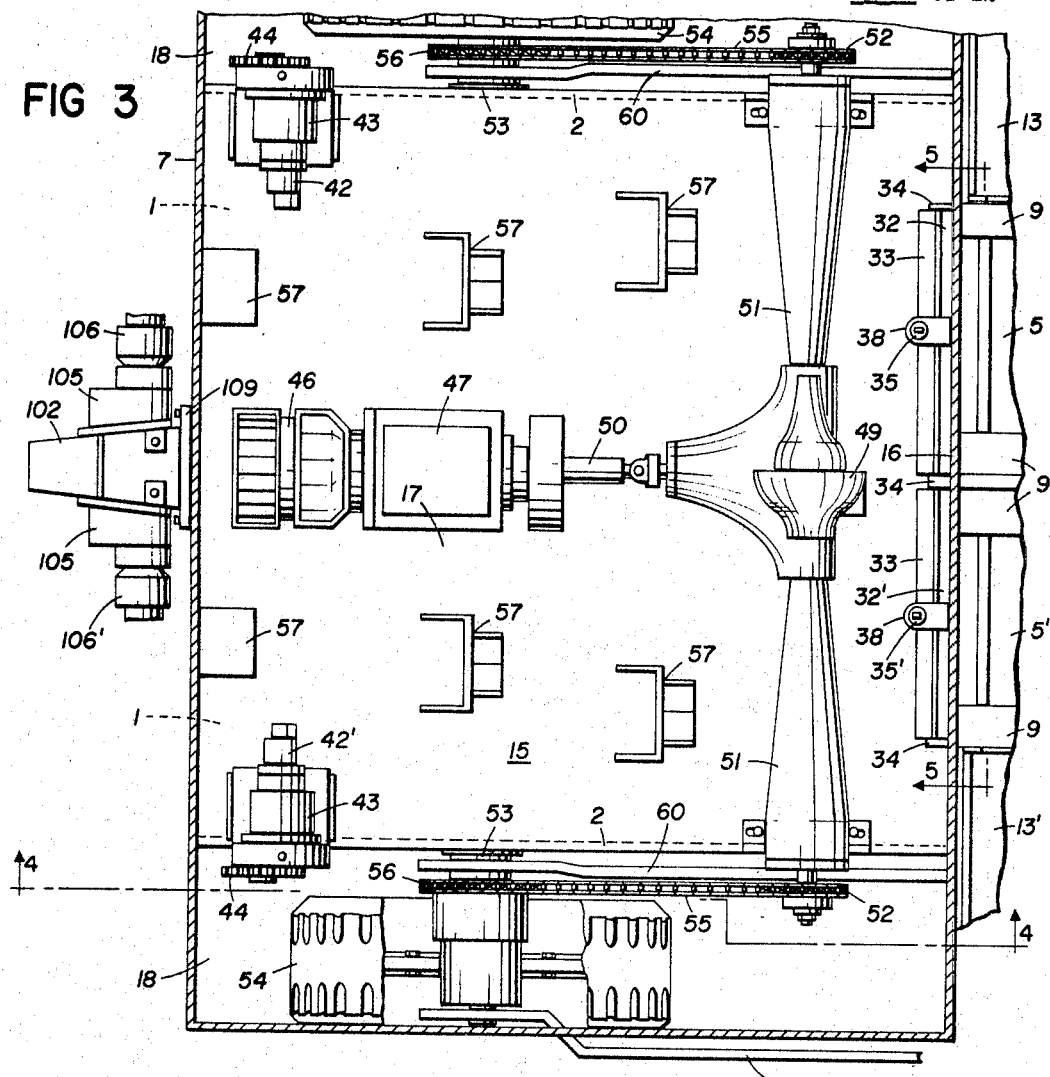
FIGURE 3 is a partial, horizontal sectional view taken along the line 3—3 of FIGURE 1 illustrating the component compartment and drives, the distributing screws being omitted.
Figure 6:
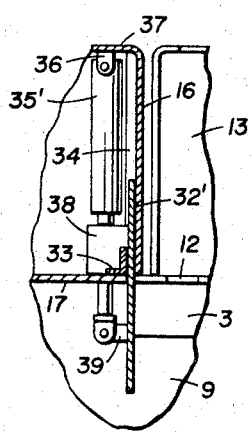
FIGURE 6 is a vertical sectional view taken along the line 6—6 of FIGURE 5.
Figure 4:
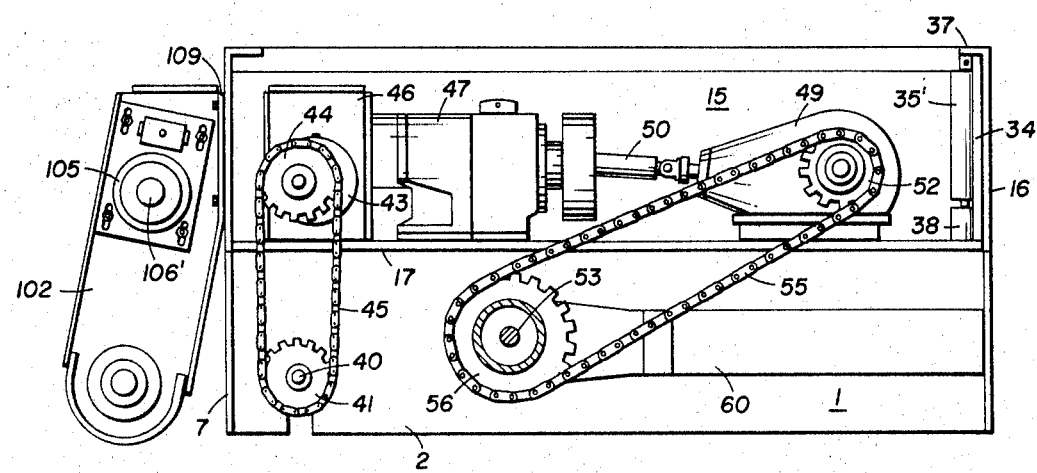
FIGURE 4 is a vertical sectional view taken along the line 4—4 of FIGURE 3.
Figure 5:
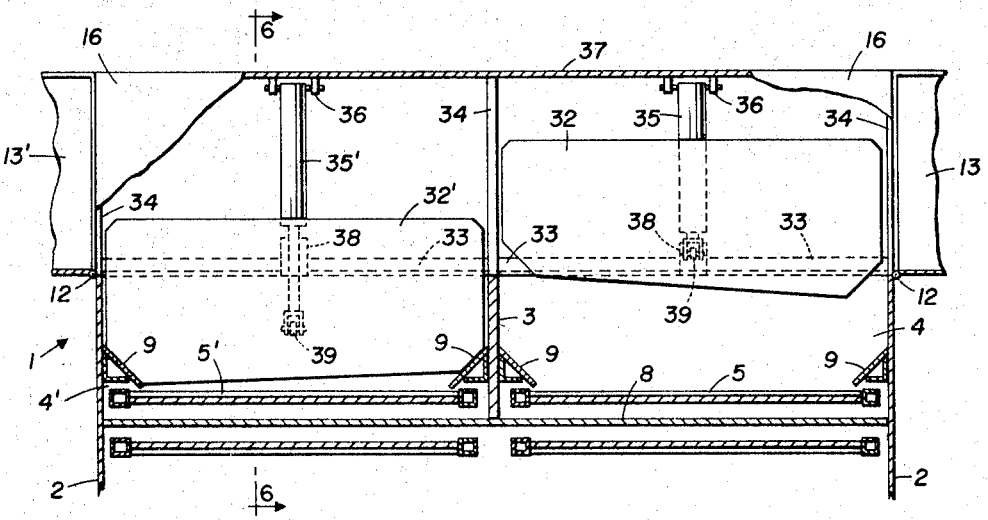
FIGURE 5 is a vertical sectional view taken along the line 5—5 of FIGURE 3 illustrating the adjustable metering gates, certain portions being broken away.

Inasmuch as many aspects of the paver illustrated in the drawings are conventional and well known to the art, it is not necessary to describe them at any length. Thus, many things are illustrated or otherwise implied in the following more detailed description which will not be specifically mentioned or, if so, will be referred to only in a general manner.

*The tractor unit and the tractor and slat conveyor drives*

Referring first to FIGURES 1–6 and 10 in particular, the paver illustrated comprises essentially a tractor unit and a screed assembly drawn thereby. The tractor unit includes an elongated conveyor housing 1 having sidewalls 2 and extending fore and aft centrally of the paver, being supported by suitable framing (not shown) in conventional fashion. The conveyor housing 1 is divided longitudinally by a central internal wall 3 into a pair of adjacent conveyor tunnels 4, 4' in which a pair of right and left hand slat conveyors 5, 5' are suitably mounted and discharged onto the roadway through a pair of openings 6, 6' in the rear end wall 7 of the tractor (see FIGURE 10). The upper and lower flights of each conveyor 5, 5' are separated by a horizontal wall 8 and material is confined thereon by shield plates 9 inclined downwardly from side walls 2 and divider wall 3. The top forward half of the conveyor housing 1 is open to expose the forward halves of the slat conveyors 5, 5' which are surmounted by a broad, relatively shallow hopper 10 occupying the entire forward half of the tractor and laterally overhanging the conveyor housing 1 for receiving bituminous materials from a truck propelled before the paver by means of truck push rollers 11. The overhanging sides of hopper 10 are hinged at their inner edges 12 for upward, inward movement to provide hopper dumps 13, 13' operated by two-way hydraulic rams 14, 14' in order to direct the bituminous material onto the slat conveyors 5, 5'. Rearward of hopper 10 and comprising the rear half of the tractor unit atop the conveyor housing 1 is a component compartment 15 having a front wall 16 and a floor 17 which also forms the top wall of the rear half of conveyor housing 1. The rear end wall 7 of the tractor also forms the rear wall of component compartment 15 and the latter laterally overhangs the side walls 2 of the conveyor housing 1 at 18, the overhanging portions 18 being open to the ground. The latter support a pair of paver control stations thereabove consisting of duplicate steering columns and wheels 20, 20', control pedestals 21, 21', control panels 22, 22', and operator seats 23, the latter supported on cantilevered platforms 24 overhanging the rear wall 7 of the tractor. The central portion of component compartment 15 supports a reversely disposed engine or prime mover 25 thereabove whose timing gear end overhangs the rear wall 7 of the tractor and drives a constant displacement auxiliary pump 26 (see FIGURE 1). The other or fly wheel end of the engine 25 drives a pair of variable displacement hydraulic pumps 27 and 28 mounted thereto in tandem, the latter being also of the reversible flow type. The displacements of both pumps are varied by means of duplicate pairs of control levers 29, 29' and 30, 30', respectively, mounted atop each control pedestal 21, 21'. The remaining top area of component compartment 15 on each side of the prime mover 25 are closed by hinged covers 31.

A pair of transversely disposed metering gates 32, 32' (see FIGURES 3–6), in plate form having their forward faces disposed against the rear face of front wall 16 of component compartment 15, are vertically slidable through suitable slots in the floor 17, being guided along their rear faces by angle irons 33 secured to floor 17 and along their vertical edges by guide plates 34 secured to front wall 16. Each gate 32, 32' is hydraulically operated by one of a pair of inverted hydraulic rams 35, 35' disposed on the inner faces of gates 32, 32' midway between their ends, the upper end of the cylinder of each ram 35, 35' being pivotally secured to a bracket 36 attached to the under side of an inwardly turned flange 37 formed on the top edge of front wall 16. The piston rod of each ram 35, 35' extends through the floor 17, being protected by suitable shields 38, and is pivotally secured to the central portion of each gate 32, 32' by a similar bracket 39. The lower ends of gates 32, 32' are suitably contoured in order to avoid interference with shield plates 9 when in their lowermost positions closely adjacent conveyors 5,5'.

The drive shafts 40 of slat conveyors 5, 5' extend through the side walls 2 of their respective conveyor tunnels 4, 4' at the outer rear corners thereof and are provided at their outboard ends with driven sprockets 41.

On its floor 17 at the rear of component compartment 15 directly above conveyor drive shafts 40 are mounted a pair of hydraulic motors 42, 42', driven by pump 27, which, through speed reducing gear boxes 43, conveyor drive sprockets 44 and drive chains 45, drive the sprockets 41 of the slat conveyors 5, 5'. The component compartment 15 contains a hydraulic motor 46, driven by pump 28, in conjunction with a three-speed manual gear box 47 having duplicate shift levers 48, 48' at the rear of each side of engine 25. Both motor 46 and gear box 47 are disposed centrally and longitudinally of the paver at the rear of component compartment 15, the output shaft of gear box 47 being directed forwardly. Across the forward end of component compartment 15 is disposed a tractor drive axle assembly containing a limited slip-type differential unit 49 centrally disposed therealong and connected to the output shaft of gear box 47 by means of a suitable propeller shaft and U-joint 50. The drive from differential 49 is taken through axle half shafts enclosed in axle housings 51 to a pair of drive sprockets 52 which overhang the side walls 2 of the conveyor housing 1. Midway along the latter are fixed a pair of stub axle assemblies 53 upon which are journaled tractor drive wheels 54 equipped with large pneumatic tires and driven by drive chains 55 and sprockets 56 secured to the inboard sides of wheels 54 in suitable alignment with drive sprockets 52. The remaining area of floor 17 of component compartment 15 may be provided with suitable brackets 57 for mounting the various hydraulic controls and connections, all as later described.

*The suspension and steering assemblies*

As mentioned, the tractor's suspension is of the three point variety. Straddling each drive wheel 54 and its sprocket 56 is a pair of spaced frame members in the form of side plates 60 (see FIGURES 1, 3, 4, 7 and 8), each pair extending forwardly along its respective side wall 2 of the conveyor housing 1 to the forward end of the paver. The rear ends of each pair of side plates 60 are journaled about its respective stub axle 53 and its forward ends joined by end plate 61 provided on its forward face with a forwardly extending trunnion 62. To each of the latter in turn are pivoted the ends of a transverse oscillating beam 63 across the forward end of the paver which is centrally journaled on a trunnion 64 fixed to the tractor framing at the forward end of conveyor housing 1. The side plates 60 and the beam 63 thus form a cradle in which the tractor is suspended upon stub axles 53 and trunnion 64 and so effectively relieved of all torsional stresses arising from travel over uneven terrain.

The forward portions of each pair of side plates 60, together with a gusset plate 65 therebetween spaced rearwardly of its end plate 61, form an enclosure for a pair of tandem mounted, small dirigible wheels 66 having hard rubber tires. Inasmuch as the steering mechanism for each pair of wheels 66 is identical, only one is illustrated and needs be described and identical reference numerals are used with reference to both (see FIGURES 7–9). A trunnion 67 extends between each pair of side plates 60 midway between its end plate 61 and gusset plate 65 to which in turn is pivoted the midpoint of a rocking beam 68 disposed fore and aft along the inner face of the inner side plate 60. The rocking beam 68 carries a supporting bushing 69 fixed thereto which encompasses trunnion 67 and is rotatable with respect thereto. The bushing 69 in turn is fitted with an outer sleeve 70, rotatable with respect thereto, to whose inner end adjacent beam 68 is fixed an upright pitman arm 71, reinforced by a suitable gusset plate 72 welded between it and sleeve 70, and bifurcated at its upper end to provide a pivotal connection 73 for the piston rod 74 of one of a pair of hydraulic steering rams 75, 75' whose other end is also pivotally anchored at 76 to the upper bifurcated end of a supporting arm 77 fixed adjacent the after end of beam 68. Fluid for the rams 75, 75' is supplied by the auxiliary pump 26, driven from the timing gear end of engine 25, through duplicate rotary steering valves 78, 78' mounted to the lower ends of steering columns 20, 20'. The pump 26 also supplies fluid for an auxiliary circuit including the hopper dump rams 14, 14', the metering gate rams 35, 35' and the screed lift rams in the manner later described in detail.

The outer face of rocking beam 68 carries a pair of short, cantilevered steering yoke supports 79 adjacent each end thereof spaced equally from trunnion 67, each of which is straddled by a steering yoke 80 pivoted thereto about a vertical axis on suitable king pins 81. The outer vertical face of each yoke 80 carries a stub axle 82 to which one of wheels 66 is journaled in suitable fashion. A steering arm 83 is fixed to the upper half of each yoke 80 and extends inboard therefrom, being bifurcated at its inner end to provide a pivotal tie rod connection 84 substantially in fore and aft alignment with pitman arm 71. The tie rod connections 84 each receive the remote ends of a pair of adjustable tie rods 85 whose inner ends are pivotally connected at 86 to pitman arm 71 intermediate sleeve 70 and steering ram connection 73. Pitman arm 71 is sufficiently extensive so that, when wheels 66 are in the straight ahead position and pitman arm 71 is vertical, the connection 86 of the forward tie rod 85 is directly above trunnion 67 while that of the after tie rod 85 is rearward of trunnion 67 and below that of the forward tie rod 85 in order to provide a suitable Ackerman effect during turns and so reduce tire scrub.

The screed and distributing screw assemblies

The floating screed assembly (see FIGURES 1 and 2) is pivotally connected in the usual manner, as by link bars 88 and adjusting screws 89 at its upper forward and rear edges, respectively, to the after ends of a pair of pull or screed arms 90 extending forwardly along each side of the paver to pivot pull points 91 on side plates 60 amidship the tractor. The hollow screed 92 is preferably energized for mat compaction by electric vibrators 93 and their associated controls 94 in the manner described in U.S. Patent 2,757,588 to Pollitz. Heat is supplied the screed interior by means of a conventional oil burning unit 95, and crowning adjustment is provided by a linkage 96 as disclosed in U.S. Patent 2,914,994, also to Pollitz. The mold board 97 is preferably of the type disclosed in U.S. Patent 2,951,246 to Pollitz and may be equipped with shoe plates 98 adjustable in the manner shown in U.S. Patent 3,262,378 to Schrimper et al.

The distributing screws 100, 100' (see FIGURES 1, 2, 10, 11) are disposed transversely of the paver between the rear end wall 7 of the tractor and the mold board 97 in conventional fashion, their inboard ends being driven by sprockets 101 carried within the lower end of a drive housing 102 centrally disposed along and cantilevered from the rear end wall 7 of the tractor, inclining downwardly and rearwardly therefrom. The housing 102 also encloses an upper pair of drive sprockets 103 aligned with driven sprockets 101 therebelow, driving the latter by means of drive chains 104. The drive sprockets 103 are mounted at the inner ends of a pair of speed reducing gear boxes 105 disposed on the opposite lateral faces of housing 102 at its upper end, to which in turn are mounted a pair of individual hydraulic motors 106, 106'. The mounting holes of each gear box 105 to housing 102 are vertically elongated in order to provide tension adjustment for drive chains 104. The motors 106, 106' are also driven from pump 27 and controlled in the manner hereafter explained in greater detail. The outboard ends of distributing screws 100, 100' are carried in suitable bearings 107 supported at the lower end of brackets 108 (only one of which is illustrated) depending from the rear end wall 7 of the tractor parallel to drive housing 102. The mounting flanges 109 and 110 of the drive housing 102 and support brackets 108 are secured by bolts to the rear end wall 7 of the tractor, the latter being provided with alternate bolt holes 111 so that the height of the distributing screw assembly as a whole may be varied over a 2½" range for the purposes pointed out above. Likewise, the fore and aft location of the distributing screw assembly may be altered, for the reasons also mentioned above, by insertion of shims between the mounting flanges 109 and 110 and the rear end wall 7 of the tractor. An overall fore and aft range of about 1½" has proved satisfactory. In order to permit these adjustments of the distributing screw assembly the hydraulic connections, as later described, from the tractor to motors 106, 106' are by means of flexible hoses.

The automatic feed control switches

As mentioned above, the automatic feed control switches (see FIGURE 10) have been moved from the rear end wall 7 of the tractor to the screed arms 90. Welded atop each screed arm 90, just aft of one of the cut-off plate mounting brackets 115, is a sleeve clamp 116 provided with a clamp screw 117, which slidably and adjustably receives the outboard end of one of a pair of transversely disposed switch mounting arms 118 extending inboard therefrom between the mold board 97 and the rear end wall 7 of the tractor. Each mounting arm 118 is provided with a switch mounting bracket 119 slidably and adjustably clamped thereto by clamp screw 120 and cantilevered therefrom forwardly out over and above distributing screws 100, 100'. The forward end of each mounting bracket 119 carries one of the two feed control switches 121, 121', wired through control panels 22, 22' as hereafter described, each of which is operated by a transversely swingable, material level sensing arm 122, inclined downwardly and outwardly therefrom. The length of each sensing arm 122 is adjustable by means of a telescoping extension thereof 123 clampingly secured thereto at 124. The lateral positions of the sensing arms 122 may be adjusted by releasing their clamp screws 120 and sliding mounting brackets 119 along their arms 118. When screed and distributing screw extensions are employed, the mounting arms 118 may be reversed in their clamps 116 so that sensing arms 122 operate outboard of screed arms 90. In either case the feed control switches 121, 121' are effectively freed from the unwanted influence of vertical movement of the rear of the tractor relative to screed 92.

The hydraulic circuits

Figure 12:
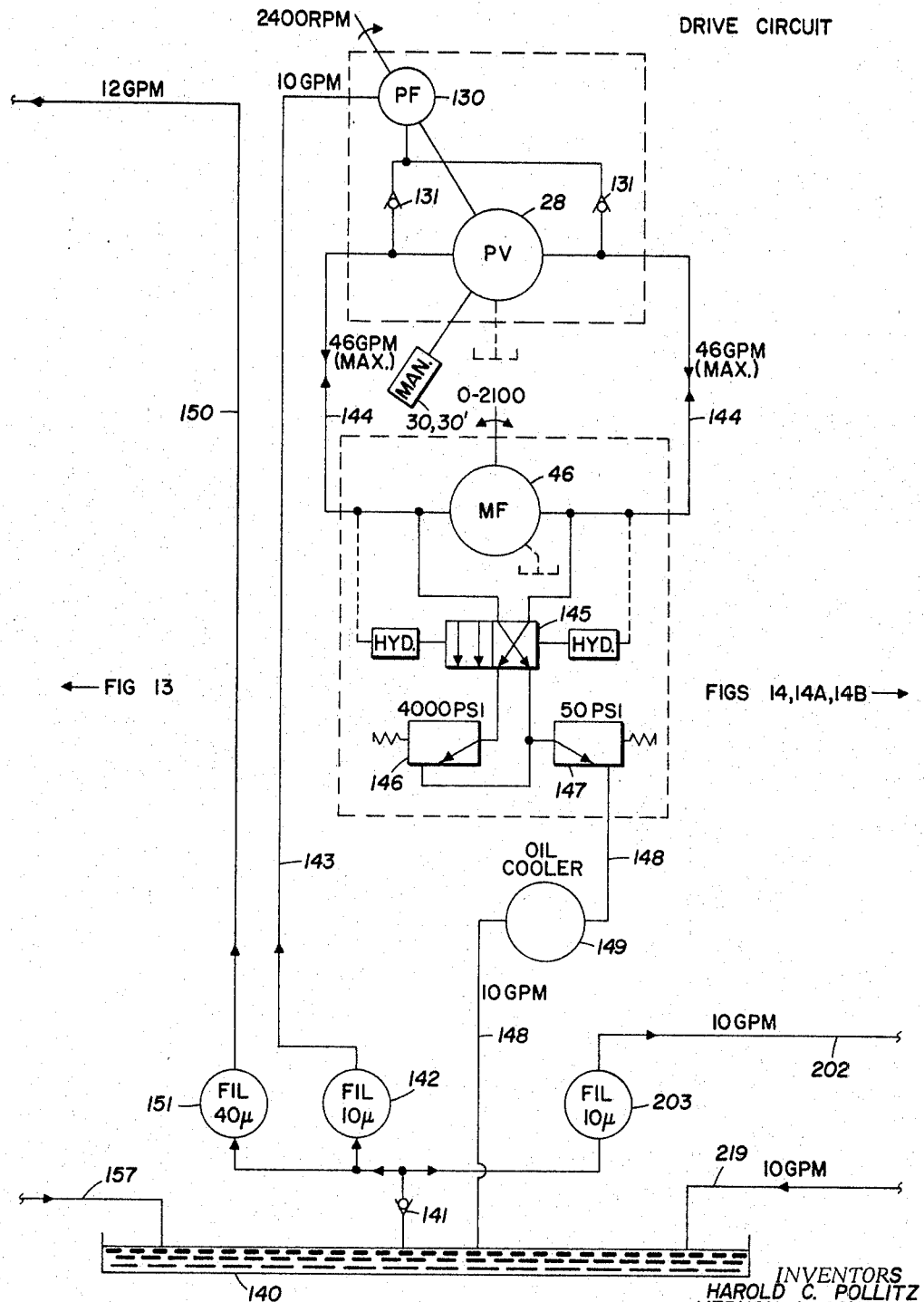
Figure 13:
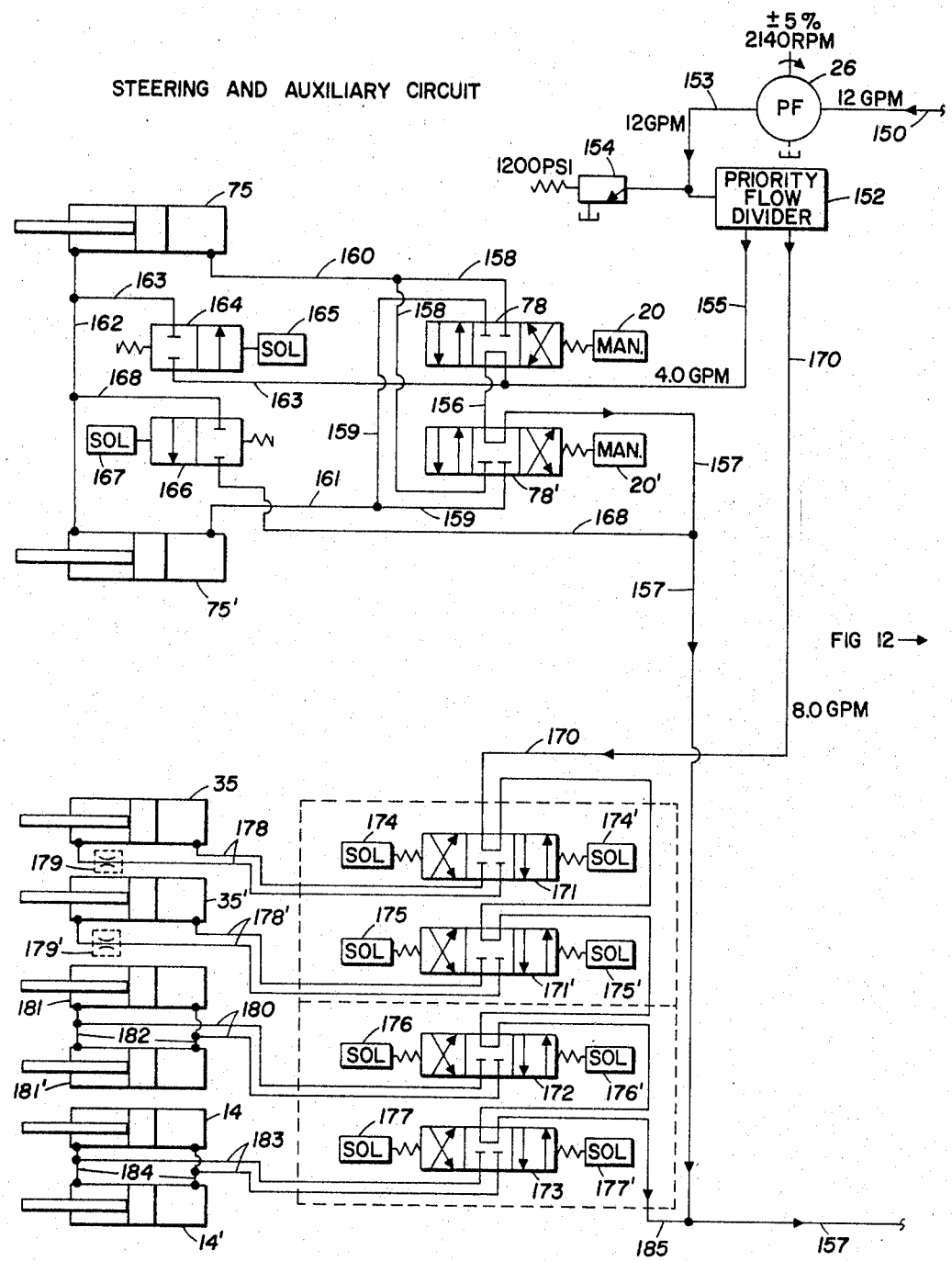

FIGURES 12, 13, 14, 14A and 14B schematically illustrate the various hydraulic components of the paver, their interconnections and controls. The components themselves are well known proprietary items and while certain values and quantities are indicated in the foregoing figures, these are merely suggestions, inasmuch as requirements will vary according to the particular paver and application involved. In any event, the requirements of a particular paver can be readily determined by those skilled in the art. Turning then to FIGURE 12 first, the reversible flow, variable displacement hydraulic pump 28 for driving the tractor, controlled by the duplicate levers 30, 30' on the control pedestals 21, 21', includes a make-up pump 130 and check valves 131 integral therewith, all suitably internally connected as indicated. Pump 130 is supplied with fluid from a reservoir 140 through a check valve 141, filter 142 and line 143 and is connected by lines 144 in a closed hydraulic circuit through the paver drive motor 46. Connected in parallel and integral with the motor 46 is an overload protective circuit including a shuttle type, two-way hydraulic servo valve 145 in series with a relief valve 146 and a bleeder valve 147, the latter returning excess fluid to the reservoir 140 through a line 148 and oil cooler 149. Thus, moving either control lever 30, 30' one way or the other, provides an infinite adjustment of paver speeds either forward or reverse.

The auxiliary pump 26 (see FIGURE 13) draws from reservoir 140 through check valve 141 by way of a line 150 and filter 151 (see FIGURE 12) and supplies a pressure compensated, priority flow divider 152, provided with two outlet ports, through a line 153 and relief valve 154. To the controlled flow port of flow divider 152 is connected a line 155 supplying the duplicate rotary steering valves 78, 78′, manually controlled by steering wheels 20, 20′, which in turn are connected in series with each other by line 156 and with the reservoir 140 by line 157. Corresponding directional outlets of valve 78, 78′ are interconnected by lines 158 and 159 from which lines 160 and 161′ respectively, lead to a pair of corresponding sides of the pistons of the steering rams 75, 75′ whose other pair of corresponding sides are interconnected by line 162. The lines 155 and 162 are interconnected by a line 163 in which is interposed a normally closed compensating valve 164 also of the shuttle type and operated by a solenoid 165. Finally, a normally closed shuttle valve 166, operated by a solenoid 167, is connected into line 168 between line 162 and line 157 to reservoir 140. Accordingly, it will be apparent that movement of either steering valve 78, 78′ in one direction or the other will cause energization of steering rams 75, 75′ in corresponding opposite directions for proper deflection of wheels 66 through the linkage described above. The solenoids 165 and 167 of valves 164 and 166 are energized from the duplicate control panels 22, 22′, and when either steering valve 78, 78′ is open and rams 75, 75′ are at either of their extreme positions, momentarily and sequentially energizing solenoids 165 and 167 will correct any disparity in the position of the piston of one of the rams 75, 75′ relative to that of the other, either by supplying through line 163 any additional fluid which may be needed in line 162 or by releasing any excess fluid from line 162 through line 168.

The excess flow port of flow divider 152 is connected by line 170 to a bank of four series related, two way shuttle valves 171, 171′, 172 and 173 operated by four pairs of solenoids 174, 174′, 175, 175′, 176, 176′ and 177, 177′, respectively. The valves 171, 171′ are connected by lines 178, 178′ to the metering gate rams 35, 35′ through flow restrictors 179, 179′, whereby either metering gates 32, 32′ may be adjusted independently of the other by energizing solenoids 174, 174′ or 175, 175′. The valve 172 is connected by lines 180 to the screed assembly lift rams 181, 181′ which are interconnected by lines 182 for conjoint operation when solenoids 176, 176′ are energized. Likewise, the valve 173 is connected by lines 183 to the hopper dump rams 14, 14′ which are interconnected by lines 184 also for conjoint operation when solenoids 177, 177′ are energized. Finally, the valve bank 171, 171′, 172 and 173 is connected by line 185 into line 157 to the reservoir 140. The four pairs of solenoids, 174, 174′, 175, 175′, 176, 176′ and 177, 177′ are also wired through control panels 22, 22′ in the manner hereafter described.

In the basic material distributing control arrangement illustrated in FIGURE 14, the variable displacement pump 27, manually controlled by the duplicate levers 29, 29′, includes a make-up pump 200 and check valves 201 all suitably internally connected to form an integral unit. Pump 200 is supplied with fluid from reservoir 140 through check valve 141, a line 202 and filter 203 (see FIGURE 12). The output of pump 27 is led through a line 204 to a two port flow proportionator 205 which divides the flow equally between two lines 206, 206′. Each line 206, 206′ is connected into an integral control assembly including a pair of hydraulic shuttle valves 207, 207′, controlled by hydraulic servo valves 208, 208′ actuated by solenoids 209, 209′. The left hand conveyor and distributing screw motors 42 and 106 are connected in series with the valve 207 and the right hand conveyor and distributing screw motors 42′, 106′ are connected in series with the valve 207′ by means of lines 210, 211 and 212 and lines 210′, 211′ and 212′ respectively. When the solenoids 209, 209′ of servo valves 208, 208′ are inactive, the flow from lines 206, 206′ merely bypasses each motor series 42, 106 and 42′, 106′ by virtue of internal passages 213, 213′ and 214 in valves 207, 207′ and lines 215 and 215′ whereupon the flow is returned to pump 27 through a line 217 into which line 212′ is also connected, thus forming a closed hydraulic circuit, the excess fluid being bled off from valve 207 through a check valve 218 and returned to reservoir 140 through line 219 and oil cooler 220. As will be apparent, when the solenoids 209, 209′ are energized, thus shifting main valves 207, 207′, the fluid from lines 206, 206′ will be routed through lines 210, 211, 212, 215, 214, 215′, 217 and through lines 210′, 211′, 212′, 217 respectively, and thus through each pair of motors 42, 106 and 42′, 106′ instead of through the passages 213, 213′. The amount of fluid passing therethrough, and thus the speeds of the aforesaid motors, is controlled by levers 29, 29′ so that the speeds of the four motors 42, 42′ and 106, 106′ may be concurrently increased or decreased over infinite steps as conditions demand. In order to protect against overloads, a pair of relief valves 221, 221′ are interposed between lines 206, 215 and 206′, 215′, respectively.

Figure 14A:
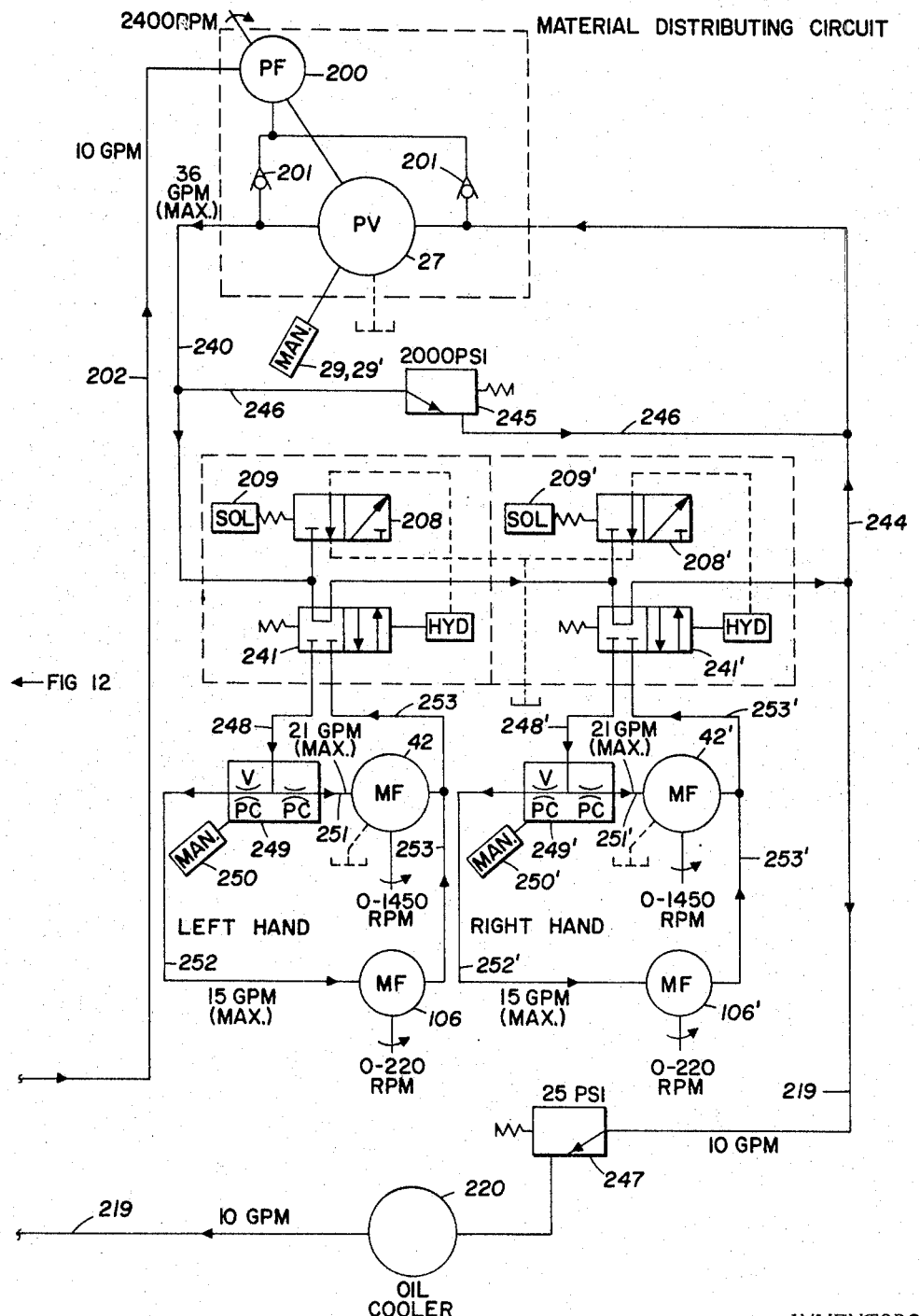
FIGURE 14A illustrates the first alternate form of the circuitry of FIGURE 14.
Figure 14B:
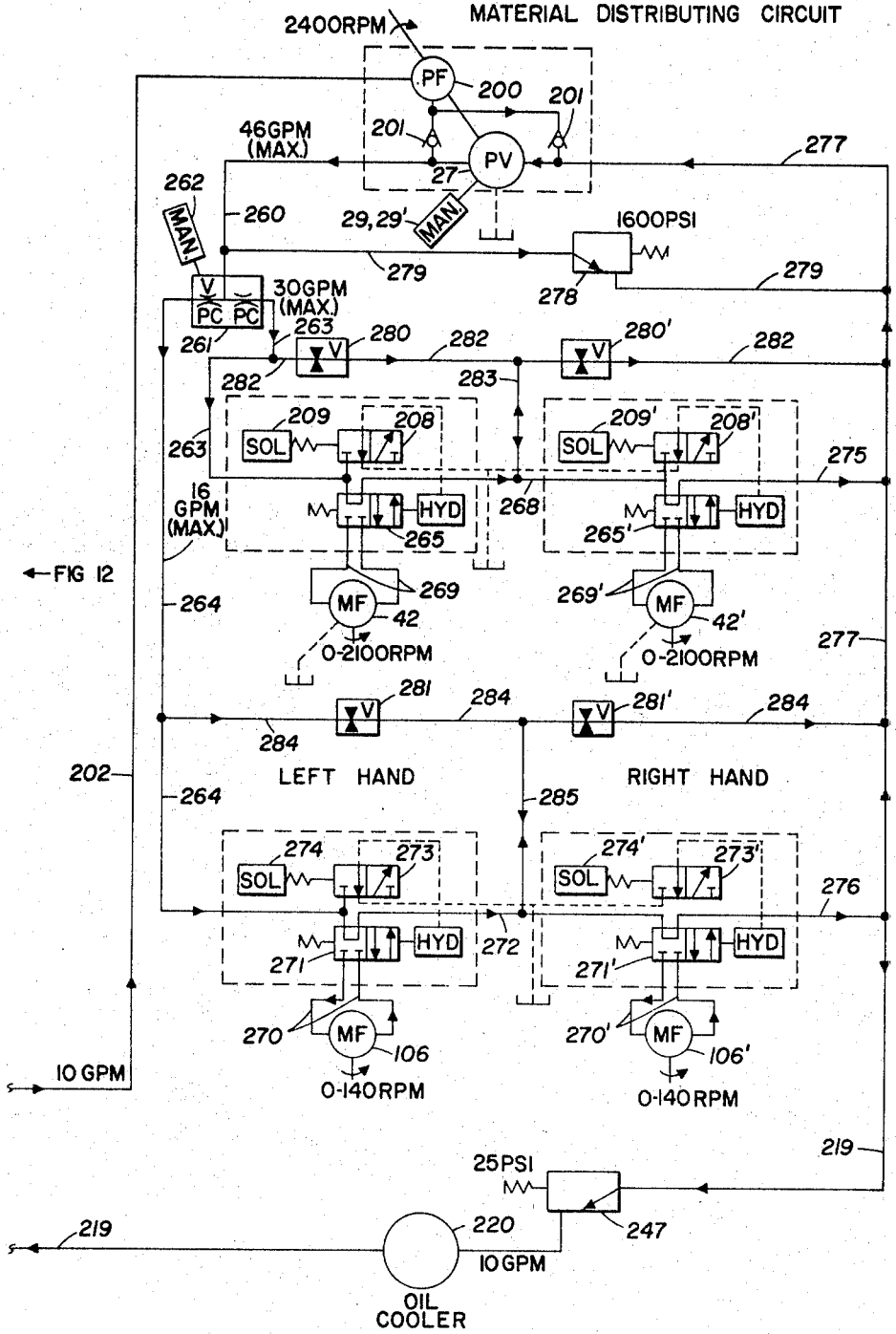
FIGURE 14B illustrates the second alternate form of the circuitry of FIGURE 14.

In the first alternate material distributing control arrangement illustrated in FIGURE 14A, components identical to those in FIGURE 14 are given identical reference numerals. In this case the output of pump 27 is led by line 240 to an integral control assembly including a pair of hydraulic shuttle valves 241, 241′ in series with each other and controlled by hydraulic servo valves 208, 208′ activated by solenoids 209, 209′. The valves 241, 241′ in their unactuated positions pass the fluid directly therethrough in a closed hydraulic circuit into return line 244 to pump 27, a relief valve 245 being connected into a line 246 between lines 240 and 244 and excess fluid being bled from the latter line through line 219 connected thereto for return to reservoir 140 through a relief valve 247 and oil cooler 220. When solenoids 209, 209′ are energized, the output of each valve 241, 241′ is diverted through lines 248, 248′ to a pair of pressure compensated flow proportioners 249, 249′, manually adjustable by means of controls 250, 250′, which divide the flow into lines 251, 251′ to conveyor motors 42, 42′ and into lines 252, 252′ to the distributing screw motors 106, 106′, the fluid from each pair of motors 42, 106 and 42′, 106′ being returned to the valves 241, 241′ through lines 253, 253′. Accordingly, the movement of either control lever 29, 29′ of pump 27 will concurrently increase or decrease the speeds of all four motors 42, 42′ and 106, 106′ over an infinite number of steps. Adjustment of either control 250, 250′ of flow proportioners 249, 249′, which controls are mounted on the rear end wall 7 of the paver, will vary the speed of conveyor motor 42 or 42′ inversely relative to either distributing screw motor 106 or 106′, as the case may be, thus providing an infinite variation of the speed of either conveyor motor relative to that of its distributing screw motor. Since varying the speed of one conveyor relative to its distributing screw provides the same function as adjustment of the metering gates 32, 32′ employed with the control arrangement of FIGURE 14, the metering gates 32, 32′ and their attendant controls shown in FIGURE 13 may be eliminated.

The second alternate arrangement for control of the material distributing system is illustrated in FIGURE 14B and again identical reference numerals are used for identical components. Here the output of pump 27 is first led through a line 260 to a pressure compensated flow proportioner 261, manually controlled by a lever 262, which divides the fluid between two lines 263 and 264. The former line supplies a pair of hydraulic shuttle valves 265, 265′, operated by hydraulic servo valves 208, 208′ and solenoids 209, 209′ and connected in series by line 268. When solenoids 209, 209′ are energized, each conveyor motor 42, 42′ is connected to its respective control valve 265, 265′ through lines 269, 269′. Similarly, the other line 264 supplies the distributing screw motors 106, 106' which are connected by lines 270, 270' through a like pair of hydraulic shuttle valves 271, 271' connected in series by line 272 and activated by hydraulic servo valves 273, 273' and solenoids 274, 274'. The fluid from each pair of valves 265, 265' and 271, 271' is returned to pump 27 through lines 275 and 276 connected into return line 277 to complete a closed circuit, a relief valve 278 being interposed in a line 279 connected between lines 260 and 277 and the excess fluid being bled off to the reservoir 140 through relief valve 247 and oil cooler 220 in line 219 connected into line 277. Bypassing each valve 265, 265' and 271, 271' is a manually adjustable bleeder valve 280, 280' and 281, 281', respectively. Bleeder valves 280, 280' are connected in series with each other into a line 282 between supply line 263 and return line 277, an intermediate connecting line 283 being interposed in line 282 between the two valves 280, 280' and line 268 to enable bleeder valve 280 to be optionally in series with valve 265' or bleeder valve 280' to be optionally in series with valve 265. The bleeder valves 281, 281' are similarly connected with respect to each other and lines 264, 277 and 272 by means of lines 284 and 285. The bleeder valves 280, 280' and 281, 281', together with control lever 262, are located on the rear end wall 7 of the tractor within easy reach of the screedman. Accordingly, movement of either control 29, 29' produces a uniform concurrent increase or decrease over an infinite number of steps in the speed of all motors 42, 42' and 106, 106' and so in their respective driven components. Movement of control lever 262, on the other hand, owing to the flow proportioner 261, will produce a concurrent increase or decrease in the speeds of both conveyor motors 42, 42' only, accompanied by a concurrent decrease or increase, respectively, in the speeds of both distributing screw motors 106, 106'. Finally, opening bleeder valve 280 or 280' will permit the speeds of the conveyor motors 42 or 42' to be infinitely adjusted relative to each other independently of the distributing screw motor 106, 106', owing to the resulting bypass of a portion of the fluid otherwise passing to the valve 265 or 265', as the case may be. Likewise, opening bleeder valve 281 or 281' will permit the speeds of the distributing screw motors 106 or 106' to be infinitely adjusted relative to each other independently of the conveyor motors 42, 42'. Here also, as in the case of the arrangement shown in FIGURE 14A and for the same reasons, the adjustable flow proportioner 261 and the bleeder valves 280, 280' and 281, 281' permit the adjustable metering gates 32, 32' to be eliminated.

*The electrical circuit*

FIGURE 15 illustrates a portion of the paver's electrical circuit with respect particularly to the duplicate control panels 22, 22' and the solenoids of the various hydraulic valves indicated in FIGURES 12 through 14B. Power is supplied by the paver's generator (not shown) driven by engine 25. The two pairs of solenoids 174, 174' and 175, 175' controlling the metering gates 32, 32', respectively, are connected as shown in series with the alternate contacts of a pair of normally open, single pole double throw toggle switches 300, 300', spring centered, which selectively control the rams 35, 35' and thus raise or lower gates 32, 32'. A pair of similar switches 301 and 302 have their alternate contacts connected as shown in series with, respectively, the solenoids 165, 167 and 176, 176' controlling the compensating valves 164, 166 for steering alignment, and the valve 172 controlling the screed lift rams 181, 181'. A pair of normally open, single pole double throw toggle switches 303, 303' have one of their pairs of corresponding contacts 304, 304' connected in series with the solenoids 209, 209', respectively, controlling valves 207, 207' in the case of the arrangement of FIGURE 14 and valves 241, 241' in the case of the arrangement of FIGURE 14A, and their other corresponding pair of contacts 305, 305' also connected in series with solenoids 209, 209' but through feed control switches 121, 121' which are normally closed, thus providing independent control, either manual or automatic, respectively, of each pair of slat conveyor and distributing screw motors 42, 106 and 42', 106' relative to the other. Of course, in the case of the two alternate control arrangements of FIGURES 14A and 14B the switches 300, 300' and solenoids 174, 174' and 175, 175' are not present if the metering gates 32, 32' are not employed in either of those two arrangements. In addition, in the case of the alternate arrangement of FIGURE 14B, the additional pair of solenoids 274, 274', indicated in broken lines in FIGURE 15, controlling valves 271, 271', are also connected in series with solenoids 209, 209', respectively, as shown so that they are energized or de-energized therewith, as the case may be, by switches 121, 121' and 303, 303'.

SUMMARY

Since operation of the paver is otherwise conventional and since operation of the novel hydraulic means and controls of the present invention, permitting adjustment of the speeds of the paver's various components over infinite number of steps, has been explained during the foregoing descriptions, those skilled in the art will readily understand other details of the paver's operation not expressly mentioned herein. Furthermore, it will be also understood, of course, that the particular paver and its drives and controls illustrated are but three embodiments of the invention. Others will readily occur to those skilled in the art. For instance, some or all of the components could be driven and controlled by electrical means, instead of hydraulic, and the same flexibility and advantages achieved. Hydraulic drive and control are preferred, however, owing to the fact that were electric motors employed more elaborate reduction gear boxes would be needed between each such motor and its driven component since suitable electric motors would necessarily have to operate at greater speeds than are required of hydraulic motors. In addition, the physical bulk of the equivalent electrical components, especially the requisite controls, would be greater.

The hydraulic circuits themselves may also be variously modified without detracting from the features and advantages of the three embodiments illustrated and described. For instance, it may be desirable to use a separate variable displacement pump for each conveyor and distributing screw motor, especially in the case of the two alternate distributing system arrangements, if power losses in the various flow proportioners should appear excessive. Or some intermediate arrangement may prove satisfactory in such cases. Therefore, the present invention is not limited to the particular embodiments and arrangements described. Instead, the following claims are to be read as encompassing all modifications and adaptations of the invention falling within the spirit and scope thereof.

We claim:

1. In a bituminous paving machine having: material receiving means to receive bituminous material and transport the same along the roadway; material handling means including material transport means to move said material from said receiving means and deposit the same upon the roadway and material spreading means to spread out said material deposited on the roadway by said transport means; and screed means to floatingly engage and transform into a bituminous mat material deposited on the roadway by said material transport means and spread out thereon by said material spreading means, the improvements in combination therewith comprising: means for moving said machine along the roadway including first drive means and first adjusting means operative upon said first drive means to vary the rate of travel of said machine along the roadway over a substantially continuous range of speeds without disconnecting said first drive means, whereby movement of said machine along the roadway is uninterrupted; means for operating said material handling means including second drive means and second adjusting means operative upon said second drive means to vary the rate of operation of said material transport and spreading means over a substantially continuous range of speeds without disconnecting said second drive means, whereby operation of said material transport and spreading means is uninterrupted, relative to and independently of the rate of travel of said machine along the roadway, each of said adjusting means being operable independently of the other during paving by said machine along the roadway.

2. The machine of claim 1 wherein said second adjusting means concurrently increases or decreases the rate of operation of both of said material transport and spreading means together and including third adjusting means operative upon said second drive means to alter the rate of operation of one of said material transport and material spreading means relative to the rate of operation of the other of said material transport and material spreading means over a substantially continuous range of speeds independently of said first adjusting means during paving by said machine along the roadway.

3. The machine of claim 2 wherein said third adjusting means substantially continuously increases the rate of operation of one of said material transport and material spreading means while concurrently substantially continuously decreasing the rate of operation of the other of said material transport and material spreading means.

4. The machine of claim 1 wherein said material transport means comprises a pair of adjacent conveyors and said material spreading means a pair of corresponding distributors disposed symmetrically about the longitudinal center line of said machine, each of said distributors engaging the material deposited upon the roadway by its respective one of said conveyors and spreading said material generally laterally outwardly with respect to said center line, said conveyors and distributors on the respective sides of said line defining a pair of material moving units; and wherein said second adjusting means concurrently increases or decreases the rate of operation of all of said conveyors and said distributors together.

5. The machine of claim 4 wherein said second drive means includes a pair of drive means respectively driving said pair of material moving units, and including third adjusting means operative upon said pair of drive means to vary the rate of operation of one of said material moving units relative to the other of said units over a substantially continuous range of speeds independently of said first adjusting means during paving by said machine along the roadway.

6. The machine of claim 4 wherein said second drive means includes individual drive means separately driving each of said conveyors and each of said distributors of both of said material moving units.

7. The machine of claim 6 including third adjusting means operative upon both of said individual drive means of one of said material moving units and fourth adjusting means operative upon both of said individual drive means of the other of said material moving units, each of said third and fourth adjusting means being independent of each other and substantially continuously increasing the rate of operation of one of the individual drive means of its respective material moving unit while concurrently substantially continuously decreasing the rate of operation of the other of the individual drive means of said unit independently of said first and second adjusting means during paving by said machine along the roadway.

8. The machine of claim 6 including third adjusting means operative upon said individual drive means of both of said conveyors and both of said distributors to substantially continuously increase or decrease the rate of operation of both of said conveyors together while concurrently substantially continuously decreasing or increasing, respectively, the rate of operation of both of said distributors together independently of said first and second adjusting means during paving by said machine along the roadway.

9. The machine of claim 8 including fourth adjusting means operative upon said individual drive means of both of said conveyors to alter the rate of operation of one of said conveyors over a substantially continuous range relative to and independently of the rate of operation of the other of said conveyors and fifth adjusting means operative upon said individual drive means of both of said distributors to alter the rate of operation of one of said distributors over a substantially continuous range of speeds relative to and independently of the rate of operation of the other of said distributors during paving by said machine along the roadway, said fourth and fifth adjusting means being operative independently of each other and said first, second and third adjusting means.

10. In a bituminous paving machine having: a tractor unit to propel said machine along a roadway; bituminous material receiving means carried by the forward end of said tractor; material handling means including a pair of material conveyors for transporting said material rearwardly from said receiving means and depositing same upon the roadway at the rear of said tractor unit adjacent each side of the longitudinal center line thereof and a pair of material distributors disposed to the rear of said tractor unit, each of said distributors being associated with one of said conveyors to distribute material deposited upon the roadway by said one conveyor generally laterally outwardly on the roadway from one side of said center line, said conveyors and distributors on the respective sides of said center line defining a pair of material moving units; and a screed assembly extending transversely and spaced rearwardly of said distributors to engage and transform into a bituminous mat material deposited upon the roadway by said conveyors and spread thereon by said distributors, said screed assembly including a pair of forwardly extending screed pull arms pivotally attached at their forward ends to said tractor, the improvements in combination therewith comprising: an engine; fluid supply means driven by said engine; means operatively fluid connected to said supply means for propelling said tractor along the roadway including first fluid motor means rotationally driven by said supply means and first fluid flow adjusting means for varying the speed of rotation of said first motor means over a substantially uninterrupted range of speeds; means operatively fluid connected to said supply means for operating said material handling means including second fluid motor means rotationally driven by said supply means and second fluid flow adjusting means for varying the speed of rotation of said second motor means over a substantially uninterrupted range of speeds relative to and independently of the speed of rotation of said first motor means, each of said adjusting means being disposed for individual operation thereof independently of the other during paving by said machine along the roadway.

11. The machine of claim 10 wherein said fluid supply means includes a first fluid pump driving said first fluid motor means; wherein said second fluid motor means includes a pair of fluid motor means respectively driving said pair of material moving units; wherein said first fluid flow adjusting means includes means for varying the volume of fluid pumped by said first fluid pump; and wherein said second fluid adjusting means concurrently increases or decreases the speeds of rotation of said pair of motor means.

12. The machine of claim 11 including a pair of means respectively controlling the flow of fluid to said pair of motor means of said pair of material moving units, said control means being operative independent of each other and said first and second fluid adjusting means, each of said control means being operated by one of a pair of sensing means, each of said sensing means being carried by said screed assembly adjacent said material distributor of one of said material moving units to cause its respective one of said control means to vary flow of fluid to said motor means of said unit when the height of said material above the roadway departs from a predetermined height.

13. The machine of claim 11 including third fluid adjusting means to vary the speed of rotation of said pair of motor means relative to each other over a substantially uninterrupted range of speeds, said third fluid adjusting means being operative independently of said first fluid adjusting means during paving by said machine along the roadway.

14. The machine of claim 11 wherein said fluid supply means includes a second fluid pump and said second fluid adjusting means includes means for varying the volume of fluid pumped by said second fluid pump; and wherein said pair of motor means are fluid connected in parallel with each other to fluid flow dividing means, said flow dividing means being fluid connected in series to said second fluid pump.

15. The machine of claim 14 wherein said motor means for each of said material moving units comprises a pair of individual fluid motors separately driving said conveyor and distributor thereof and fluid connected in series with each other; wherein said flow dividing means comprises a fixed flow proportionator; and wherein said material conveyors are provided with a pair of gates effective to adjust the amount of material transported by said conveyors from said material receiving means to the roadway, each of said gates being operated by fluid means and adjustable independently of the other.

16. The machine of claim 15 wherein the fluid flow through the two motors of each of said material moving units is controlled by a fluid valve disposed in series between said motors and said flow proportionator and operative independently of each other and said first and second fluid adjusting means, each of said valves being operated by one of a pair of sensing means, each of said sensing means being carried by said screed assembly adjacent said material distributor of one of said material moving units and operating said valve to reduce flow of fluid to the two motors of said unit when said material exceeds a pre-determined height above the roadway.

17. The machine of claim 11 wherein said motor means for each of said material moving units comprises a pair of individual fluid motors separately driving said conveyor and distributor thereof and fluid connected in parallel with each other to said fluid supply means; and including third fluid adjusting means operative upon the two motors of one of said units and fourth fluid adjusting means operative upon the two motors of the other of said units, each of said third and fourth fluid adjusting means substantially continuously increasing the flow of fluid to and the rotational speed of one motor of one of said units while concurrently substantially continuously decreasing the flow of fluid to and the rotational speed of the other motor of said unit during paving along the roadway, said third and fourth fluid adjusting means being independent of each other and of said first and second fluid adjusting means.

18. The machine of claim 17 wherein said fluid supply means includes a second fluid pump and said second fluid adjusting means comprises means for varying the volume of fluid pumped by said second fluid pump; and wherein said third and fourth fluid adjusting means comprise a pair of adjustable pressure compensated flow proportioners connected between the two motors of each of said units, both of said flow proportioners being connected in parallel with said second fluid pump.

19. The machine of claim 18 wherein fluid flow through the two motors of each of said material moving units is controlled by a fluid valve connected in series between the one of said flow proportioners associated therewith and said second fluid pump, each of said valves being independent of each other and said first and second fluid adjusting means and said flow proportioners and, operated by one of a pair of sensing means, each of said sensing means being carried by said screed assembly adjacent said material distributor of one of said material moving units and operating said valve to reduce flow of fluid to the two motors of said unit when said material exceeds a predetermined height above the roadway.

20. The machine of claim 11 wherein said motor means for each of said material moving units comprises a pair of individual fluid motors separately driving said conveyor and distributor thereof; wherein the two motors driving said conveyors are fluid connected in series with each other and the two motors driving said distributors are fluid connected in series with each other, the two pairs of said series connected motors being fluid connected to said fluid supply means; and including third fluid adjusting means operative upon said motors to substantially continuously increase flow of fluid to and the rotational speeds of one of said pairs of series connected motors together while substantially continuously decreasing the flow of fluid to and the rotational speeds of the other of said pairs of series connected motors together during paving by said machine along the roadway, and fourth and fifth fluid adjusting means operative upon said motors, each of said fourth and fifth fluid adjusting means adjusting the flow of fluid to and the rotational speed of one motor of one of said series connected pairs thereof independently of the rotational speed of the other motor of said pair over a substantially uninterrupted range of speeds during paving by said machine along the roadway, said third, fourth and fifth fluid adjusting means being operable independently of each other and said first and second fluid adjusting means.

21. The machine of claim 20 wherein said fluid supply means includes a second fluid pump and said second fluid adjusting means comprises means for varying the volume of fluid pumped by said second fluid pump; wherein said third fluid adjusting means comprises an adjustable pressure compensated flow proportioner, said pairs of series connected motors being connected in parallel with said adjustable flow proportioner and the latter being connected in series with said second fluid pump; and wherein said fourth and fifth fluid adjusting means comprise two pairs of adjustable fluid bleeder valves, each of said adjustable bleeder valves being fluid connected in parallel with and bypassing one motor of each of said pairs thereof.

22. The machine of claim 21 wherein the fluid flow through each of said motors of each of said material moving units is controlled by a fluid valve connected in series between said motor and said flow proportioner, all of said valves being independent of each other, said first and second fluid adjusting means and said flow proportioner, the pair of said valves controlling the two motors of one of said material moving units being operated by one of a pair of sensing means, each of said sensing means being carried by said screed assembly adjacent said material distributor of one of said material moving units and operating said pair of valves to reduce flow of fluid to the two motors of said unit when said material exceeds a predetermined height above the roadway.

23. The machine of claim 10 wherein said tractor includes a tractor body and a tractor suspension assembly carrying said body, said suspension assembly comprising frame members extending longitudinally along each side of said tractor body, the after portions of said frame members being horizontally journaled to said tractor body adjacent the rear corners thereof, the forward portions of said frame members being journaled to the end portions of a transverse member horizontally journaled at its central portion to the forward end of said tractor body to permit said member and the forward end portions of said frame members to oscillate about said central journal, whereby said tractor body is suspended upon said journals at the rear corners thereof and said central journal; a ground engaging dirigible wheel horizontally journaled adjacent the forward portion of each of said frame members; steering means for said dirigible wheels disposed upon said tractor body for operation thereof during paving by said machine along the roadway; and a pair of ground engaging drive wheels journaled about axes concentric with the axes of said frame members at their respective rear corners of said tractor and driven by said first fluid motor means.

24. The machine of claim 23 wherein said tractor includes two pairs of dirigible wheels, each pair of said wheels being disposed in tandem with respect to each other, the two wheels of each of said pairs thereof being rotatably and dirigibly mounted adjacent the ends of a fore and aft extending rocking member for steering movement relative thereto, said member being horizontally journaled at its central portion to the forward portion of one of said frame members.

25. The machine of claim 24 wherein said steering means comprises a fluid pump driven by said engine, a pair of two-way fluid rams supplied by said pump, each of said rams being operatively interconnected with the two dirigible wheels of one of said pairs thereof for coordinate steering movement thereof, and a valve disposed in series between said pump and said rams, said rams being fluid interconnected with each other and with said valve to operate said rams in either of their two directions for coordinate steering movement of both pairs of said wheels, said valve being controlled by said steering means.

26. In a bituminous paving machine having a driven tractor unit, material receiving means, a pair of material conveyors and a pair of respective material spreaders, the improvement comprising: a tractor body and a tractor suspension assembly carrying said body, said suspension assembly including tortionally flexible frame members extending longitudinally along each side of said tractor body, the after portions of said frame members being horizontally journaled to said tractor body adjacent the rear corners thereof, the forward portions of said frame members being journaled to the end portions of a transverse member horizontally journaled at its central portion to the forward end of said tractor body to permit said member and the forward end portions of said frame members to oscillate about said central journal, whereby said tractor body is suspended upon said journals at the rear corners thereof and said central journal; two pairs of ground engaging dirigible wheels; means to cause said wheels to steer said machine along the roadway comprising a fluid pump, a pair of two-way fluid rams connected in series with said pump and a steering valve fluid connected between said pump and rams and disposed for operation during paving by said machine along the roadway, each pair of said wheels being disposed adjacent a forward corner of said tractor in tandem with respect to each other, the two wheels of each of said pairs thereof being rotatably and dirigibly mounted adjacent the ends of a fore and aft extending rocking beam for steering movement relative thereto, each of said beams being horizontally journaled at its central portion to the forward portion of one of said frame members, each of said rams being operatively connected to one of said pairs of wheels for coordinate steering movement of said pair of wheels and both of said rams being fluid interconnected with each other and said valve for coordinate steering movement of both pairs of said wheels; a pair of ground engaging drive wheels journaled about axes concentric with the axes of said frame members at their respective rear corners of said tractor effective to move said tractor along the roadway; and means driving said drive wheels.

27. The machine of claim 26 wherein one piston side of one of said rams is fluid connected in series with said pump through said valve and the corresponding piston side of the other of said rams is fluid connected in series with a fluid reservoir, the remaining corresponding piston sides of said rams having a fluid interconnection, the combination therewith of a steering alignment circuit including a first normally closed compensating valve fluid connected in series between said ram interconnection and said reservoir and a second normally closed compensating valve connected in series between said ram interconnection and said pump, said valves being optionally independently operable to open position in order to permit flow of fluid, respectively, from said interconnection to said reservoir or to said interconnection from said pump.

References Cited

UNITED STATES PATENTS

| | | | |
|---|---|---|---|
| 2,351,592 | 6/1944 | Barber | 94—46 |
| 2,589,257 | 3/1952 | Horning | 94—46 |
| 3,015,258 | 1/1962 | Apel et al. | 94—46 |
| 3,036,504 | 5/1962 | Sayre | 94—46 |
| 3,301,151 | 1/1967 | Hanson | 94—46 |

OTHER REFERENCES

Barber-Green: pamphlet pages 8 and 15, received in Patent Office August 1960.

JACOB L. NACKENOFF, *Primary Examiner.*